Patented Sept. 8, 1931

1,822,033

UNITED STATES PATENT OFFICE

RUSSELL L. JENKINS AND CHARLES GLENNON HARDY, OF ANNISTON, ALABAMA, ASSIGNORS TO SWANN RESEARCH, INCORPORATED, A CORPORATION OF ALABAMA

SEALING COMPOSITION

No Drawing.   Application filed April 21, 1930.  Serial No. 446,176.

This invention realtes to a new composition of matter which has valuable properties especially in the field of heat molded plastics and sealing waxes.

One of the objects of this invention is the provision of a material which while acting as a sealing wax, such as is commonly applied by heat is sufficiently fire resistant so that it will not support combustion.

Another object of this invention resides in the production of a plastic material which can be made in a variety of colors for the production of colored objects of ornamental or practical value.

In its simplest form, our invention resides in the discovery that plastic fire-resisting compositions may be made by melting together various proportions of a chlorinated diphenyl resin and ordinary pine rosin.

Chlorinated diphenyl resins which we have found suitable for our purpose are produced by chlorinating diphenyl to varying percentages of chlorine content, and are now on the market. These substances are available both as black or clear resins, depending on the process employed in producing them.

While the proportions of diphenyl resin and common rosin used may be varied within wide limits, we prefer to use approximately equal quantities by weight of these materials when producing a sealing wax. To this material is added a filler in the nature of a pigment or coloring matter, such as red iron oxide which has been finely ground. Suitable proportions are as follows:—

100 pounds black chlorinated diphenyl resin of 72° C. softening point; 100 pounds of pine rosin; 200 pounds of fine red iron oxide.

The diphenyl resin and pine rosin are melted together in a heated mixer until quite fluid, say to 160° C. The red iron oxide in a dry condition is then stirred in, until all has been added and a uniform product is obtained. The melt is then cast into suitable molds.

Instead of employing the black diphenyl resin, we utilize one of the clear diphenyl resins and obtain lighter colored waxes. At the same time pigments other than red iron oxide may be employed and various colors obtained.

While we have described our invention in but one form, it will be obvious to those skilled in the art that it is not so limited, but is susceptible of various changes and modifications, without departing from the spirit thereof, and we desire, therefore, that only such limitations shall be placed thereupon as are imposed by the prior art, or as are specifically set forth in the appended claims.

What we claim is:

1. A sealing wax base containing a chlorinated diphenyl resin and rosin.
2. A sealing wax base containing a chlorinated diphenyl resin and approximately 50 per cent by weight of rosin.
3. A sealing wax containing a base according to claim 1 and a pigment.
4. A sealing wax containing a base according to claim 1 and red iron oxide.

In testimony whereof we affix our signatures.

RUSSELL L. JENKINS.
C. GLENNON HARDY.